(12) United States Patent  
Doolittle et al.

(10) Patent No.: US 10,462,979 B1  
(45) Date of Patent: Nov. 5, 2019

(54) INJECTION PLUG FOR INSERTION INTO A TREE

(71) Applicants: Glayne Doolittle, Omaha, NE (US); Michael Frisina, Omaha, NE (US)

(72) Inventors: Glayne Doolittle, Omaha, NE (US); Michael Frisina, Omaha, NE (US)

(*) Notice: Subject to any disclaimer, the term of this patent is extended or adjusted under 35 U.S.C. 154(b) by 168 days.

(21) Appl. No.: 15/629,200

(22) Filed: Jun. 21, 2017

(51) Int. Cl.  
*A01G 7/06* (2006.01)  
*A01G 7/00* (2006.01)  
*A01G 29/00* (2006.01)

(52) U.S. Cl.  
CPC .............. *A01G 7/06* (2013.01); *A01G 7/00* (2013.01); *A01G 29/00* (2013.01)

(58) Field of Classification Search  
CPC . A01G 7/06; A01G 7/00; A01G 29/00; A01G 17/18; A01G 23/10; A01G 7/18  
USPC ...................................... 47/8, 57.5  
See application file for complete search history.

(56) References Cited

U.S. PATENT DOCUMENTS

| | | | |
|---|---|---|---|
| 3,706,161 A | 12/1972 | Jenson | |
| 3,864,874 A | 2/1975 | Norris et al. | |
| 4,698,935 A * | 10/1987 | Cronenwett | A01G 7/06 47/57.5 |
| 4,833,824 A * | 5/1989 | Cronenwett | A01G 7/06 47/57.5 |
| 4,896,454 A * | 1/1990 | Cronenwett | A01G 7/06 248/219.4 |
| 4,989,366 A * | 2/1991 | DeVlieger | A01G 7/06 47/57.5 |
| 5,114,032 A * | 5/1992 | Laidlaw | A01G 17/18 215/247 |
| 5,239,773 A | 8/1993 | Doolittle, Jr. | |
| 5,797,215 A * | 8/1998 | Doolittle | A01G 7/06 47/57.5 |
| 6,216,388 B1 * | 4/2001 | Miller | A01G 7/06 424/405 |
| 6,311,429 B1 * | 11/2001 | Wolfe | A01G 7/06 47/11 |
| 2002/0157307 A1 * | 10/2002 | Brown | A01G 7/06 47/8 |

* cited by examiner

*Primary Examiner* — Monica L Williams  
*Assistant Examiner* — Christopher D Hutchens  
(74) *Attorney, Agent, or Firm* — Dennis L. Thomte; Thomte Patent Law Office LLC

(57) ABSTRACT

An injection fluid retention plug is provided which may be inserted into a preformed hole in a tree. The plug includes a hollow shank portion which is filled with a resilient material. The inner and outer ends of the shank portion have the same outer diameter. The shank portion does not have a flange at the outer end thereof.

8 Claims, 4 Drawing Sheets

INJECTION PLUG FOR INSERTION INTO A TREE

BACKGROUND OF THE INVENTION

Field of the Invention

This invention relates to a novel injection plug for insertion into a tree.

Description of the Related Art

It has previously been known to form a hole in the exterior of a tree and to implant capsules of nutrients or treatment fluids into those holes. Representative tree injection capsules are disclosed in Jenson U.S. Pat. No. 3,706,161 and Norris et al. U.S. Pat. No. 3,864,874. Both patents show and suggest that the capsules are inserted into pre-drilled holes of a depth extending through and beyond the cambium layer of the tree. The drilling of a hole beyond the cambium layer of a tree, however, injures the tree and triggers a defensive reaction of the tree to wall off the injured area thereby losing stored food that would otherwise be available for growth. The size of the xylem is reduced and an air pocket in contact the xylem allows decay, Successful injection of nutrients and treatment chemicals into a tree was accomplished with the improved tree injection system of U.S. Pat. No. 5,239,773 wherein a specially designed fluid injection needle could be inserted at an angle through the bark of a tree to contact the xylem layer of the tree, but without penetrating or damaging the xylem layer. This system works best during the period of the year of active growth of the tree. In the Midwestern United States, this period extends for five to six months, including April, May, June, July, August and some of September. Thereafter, the tree tends to shutdown and cannot as effectively hold the injected fluid in a bubble between the xylem and inner bark layers of the tree. Outside of the growing season, the injected fluid tends to lead outwardly through the hole formed by the fluid injection treatment. The invention of U.S. Pat. No. 5,797,215 was designed to extend the portion of the year in which trees may be injected with fluids by plugging the hole into which the liquid chemicals are injected and preventing them from running out prior to being taken up by the tree. U.S. Pat. No. 5,239,773 describes at Column 6, lines 23-27 that when the needle is removed, the bark and cambium close the needle hole because of their resiliency. This does not always happen early or late in the growing season, on certain trees such as the linden tree or on overcast days. The process of keeping the chemical in the tree was facilitated by the apparatus and method of the invention of U.S. Pat. No. 5,797,215.

In each of the plugs of the '215 patent, the outer end thereof has a flange at the outer end thereof. Although the plugs of the '215 patent have met with considerable success, the flanges thereof limited the inward movement of the plug into the tree.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

This invention is directed to an injection fluid retention plug for insertion into a hole in the outer bark layer of a tree for retaining injection fluid injected from a fluid injection device through the hole to a position between the xylem and inner bark layers of the tree. The plug is of a size and shape to fill the cross-sectional area of the preformed hole in the tree. It includes a core of resilient material penetrable by the injection needle for injecting fluids between the xylem and inner bark layers, which core is expandable upon withdrawal of the fluid injection needle to fill the hole and substantially block leakage of fluids outwardly through the hole. The plug does not include an outer flange.

Barbs may be provided on the outer surface of the shank to retain the plug in the inserted position. In thin barked trees, the plug may be only partially inserted with an outer portion protruding from the tree.

A primary object of the present invention therefore is to provide an injection plug for insertion into trees and so as to retain the injection fluid in the tree until it can be naturally taken up by the tree.

Another object of the invention is to provide an injection fluid retention plug which enables the successful injection of fluids into a tree, without leakage, throughout a longer period of the year than could be accomplished without the apparatus and method of the invention.

Another object of the invention is to enable the successful injection and retention of fluids in a tree without wounding the tree.

Another object is to provide a plug for use in injecting fluids into a tree which prevents air from penetrating the bark, thereby prohibiting the growth of fungus.

A further object of the invention is to provide a plug for retaining injected fluids in a tree, which is simple and rugged in construction, economical of manufacture and efficient in operation.

A further object of the invention is to provide a tree plug which does not have a flange at the outer end thereof.

Another object of the invention is to provide a plug that does not penetrate into the xylem of the tree.

Yet another object of the invention is to provide a tree plug which may be more quickly and easily inserted into a tree.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
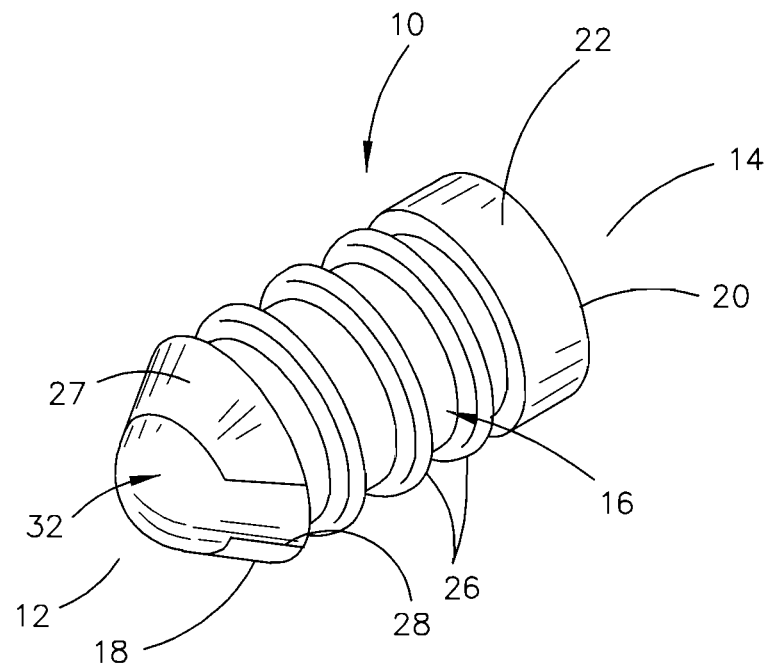
FIG. 1 is an inner perspective view of the injection plug of this invention.
Figure 2:
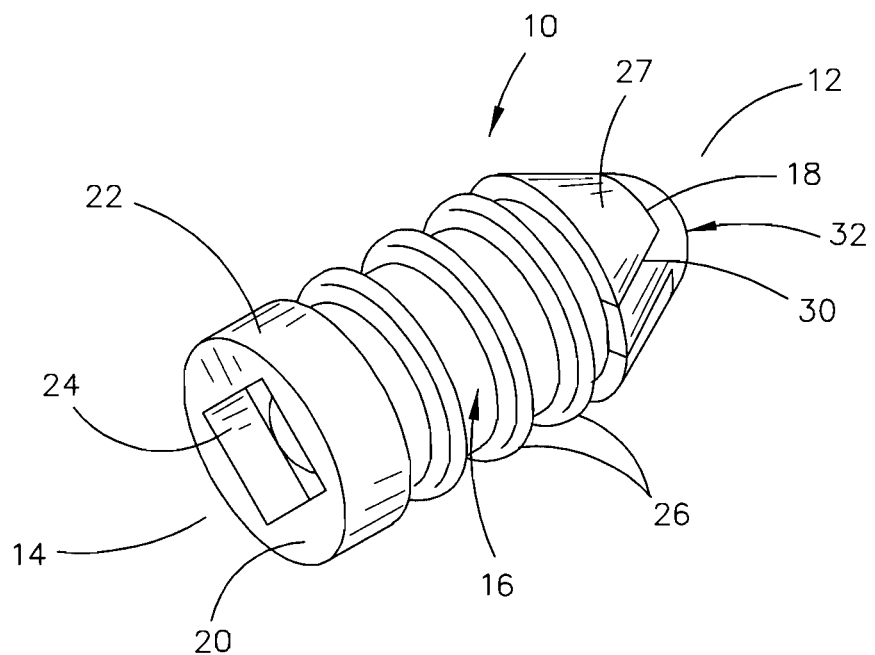
FIG. 2 is an outer perspective view of the injection plug of this invention.
Figure 3:
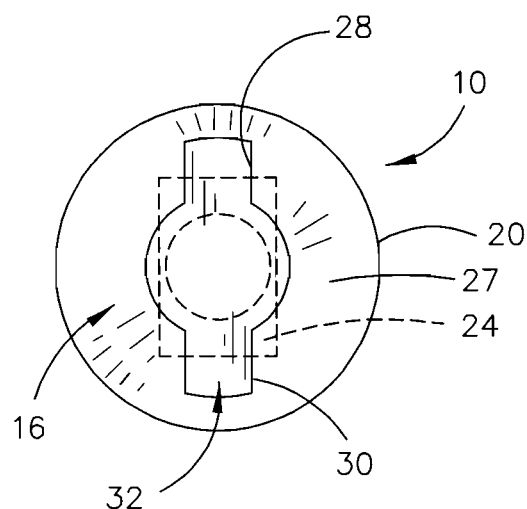
FIG. 3 is an inner end elevational view of the injection plug of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to the injection plug of this invention. The plug 10 is designed to be inserted into a preformed hole in a tree. U.S. Pat. No. 5,797,215 describes and shows the purpose of tree injection plugs. The disclosure of U.S. Pat. No. 5,797,215 is incorporated by reference thereto to complete this disclosure if needed.

Plug 10 will be described as having an inner end 12 and an outer end 14. Plug 10 includes an elongated tubular shank 16 having an inner end 18 and an outer end 20. Shank 16 is preferably comprised of a plastic material but could be comprised of other materials. As seen, the outer end 20 of shank 16 has an outer wall 22 which preferably has a rectangular opening 24 formed therein. Opening 24 could be circular if so desired. Preferably, the outer surface of shank 16 has a plurality of spaced-apart ring-shaped barbs 26 extending outwardly therefrom. As seen, the shank 16 has a truncated conical-shaped portion 27. The inner end 18 of shank 16 has at least two slits or slots 28 and 30 formed therein.

Shank 16 is filled with a resilient material such as silicone, neoprene or urethane 32, but not limited to those materials. Some of the material 30 is positioned in the slits or slots 28 and 30 thereby maintaining the core of the material 32 in shank 16 as the injection needle is withdrawn therefrom.

In operation, a series of circumferentially spaced-apart holes are formed in the outer part of the tree as described in the '215 patent. Each of the holes are preferably formed as to correspond to the depth of the shank 16 but in no event should be of a depth greater than the depth of the xylem layer from the exterior surface of the outer bark of the tree. Each of the holes preferably stop short of the xylem layer so that there is some inner bark between the inner end of the hole and the xylem.

Upon formation of the hole, the plug 10 is inserted into the hole, preferably to substantially fill it. If the outer bark of the tree is of a depth greater than the plug 10, the plug 10 is fully inserted into the tree. If, however, the depth of the outer bark of the tree is less than the depth of the plug 10, the plug 10 is preferably only partially inserted so that an outer end portion remains protruding outwardly of the tree. It is preferable that the plug 10 not penetrate the phloem or inner bark of the tree, or only minimally if needed in the case of thin bark trees.

Figure 4:
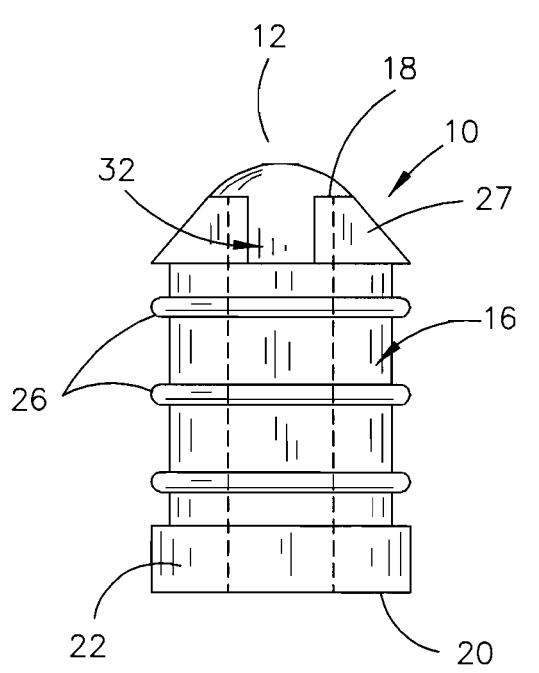
FIG. 4 is a side elevational view of the injection plug of this invention.
Figure 5:
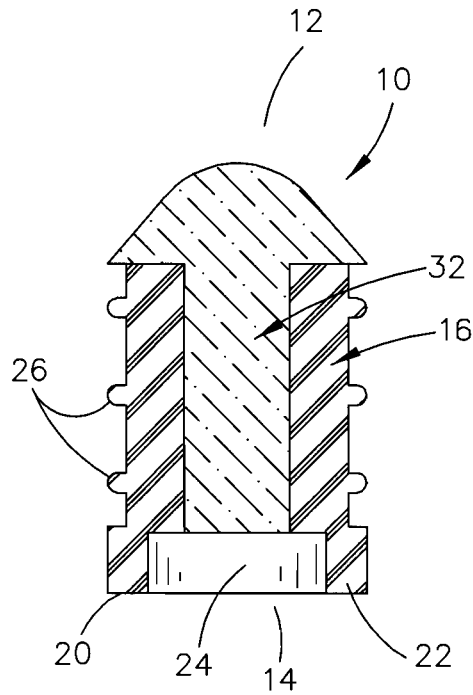
FIG. 5 is a sectional view of the injection plug of this invention.
Figure 6:
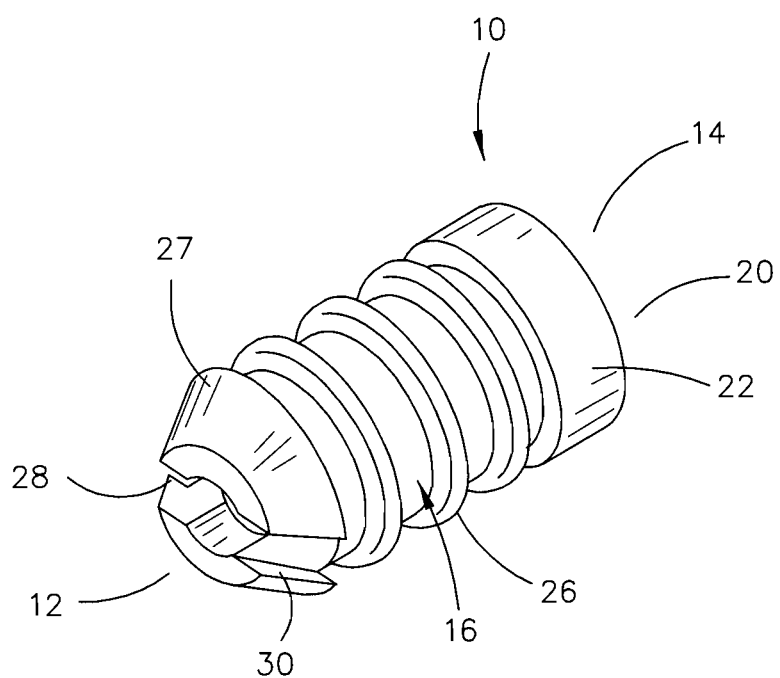
FIG. 6 is another perspective view of the injection plug of this invention without the resilient material therein.
Figure 7:
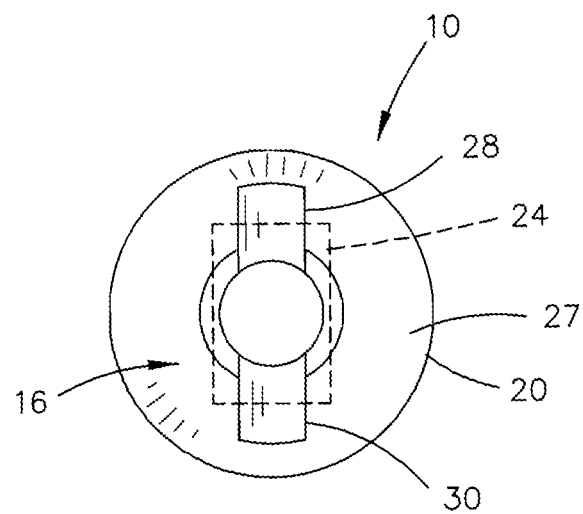
FIG. 7 is a top elevational view of the injection plug of this invention without the resilient material therein.
Figure 8:
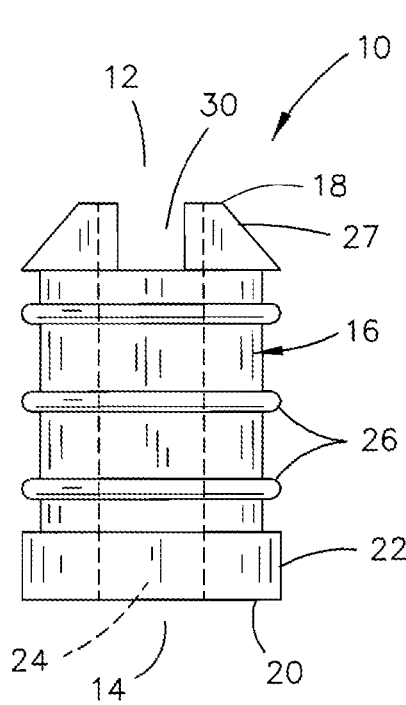
FIG. 8 is a side elevational view of the injection plug of this invention without the resilient material therein.
Figure 9:
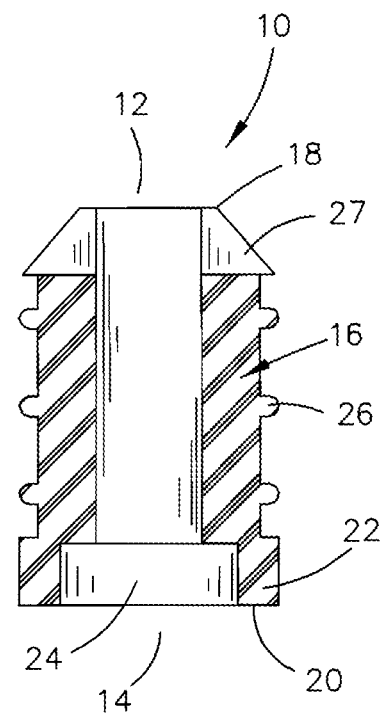
FIG. 9 is a sectional view of the injection plug of this invention without the resilient material therein.

Next, fluid is injected through the plug 10 with a fluid injection needle as disclosed in the '215 patent. The needle is driven through the plug to the point of contact with the xylem layer of the tree. At this point, fluid is injected through the needle. Upon withdrawal of the fluid injection needle from the plug 10, the resilient core of the plug 10 expands to fill the hole created by the needle. The material 32 fills the slits or slots 28 and 30 as seen in FIG. 4. The material, which is positioned in the slits or slots 28 and 30, resists outer movement of the plug 10 as the injection needle is withdrawn from the plug 10.

The fact that the plug 10 does not have an outer flange enables the plug 10 to be inserted to a greater depth into the tree than would be possible if the plug had an outer flange. As seen, the outer diameter of the conical-shaped portion 27, the outer diameter of the barbs 26 and the outer diameter of the wall 22 results in the plug having the inner and outer ends thereof having the same diameter.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:

1. An injection fluid retention plug for insertion into a hole in the outer bark layer of a tree for retaining injection fluid injected from a fluid injection needle through the hole to a position between the xylem and inner bark layer of the tree, comprising:

an elongated tubular shank having an inner end, an outer end, an interior and an exterior;

said shank being comprised of a substantially rigid material;

said shank having a truncated conical-shaped portion at said inner end thereof;

said truncated conical-shaped portion having an open inner end;

said truncated conical-shaped portion having at least two slits formed therein;

said at least two slits extending outwardly from said inner end of said truncated conical-shaped portion;

a resilient core positioned in said shank which fills said interior of said shank and which fills said at least two slits in said truncated conical-shaped portion at said inner end of said shank;

said resilient core also having an inner end portion which is positioned inwardly of said open inner end of said truncated conical-shaped portion;

said resilient core remaining in said interior of said shank and in at least two slits formed in said truncated conical-shaped portion at said inner end of said shank when an injection needle is extended through said resilient core and withdrawn from said resilient core;

said inner end of said resilient core also remaining inwardly of said inner end of said truncated conical-shaped portion when an injection needle is extended through said resilient core and withdrawn from said resilient core;

said at least two slits of said truncated conical-shaped portion resisting outer movement of said resilient core as the injection needle is withdrawn from said resilient core;

said inner end portion of said resilient core resisting outer movement of said resilient core as the injection needle is withdrawn from said resilient core; and said resilient core expanding to close the hole created by the injection needle upon the withdrawal of the injection needle from said resilient core.

2. The plug of claim 1 wherein said shank is comprised of a plastic material.

3. The plug of claim 1 wherein said core is comprised of a silicone material.

4. The plug of claim 1 wherein said core is comprised of a neoprene material.

5. The plug of claim 1 wherein said core is comprised of a urethane material.

6. The plug of claim 1 wherein said exterior surface of said shank has a plurality of barbs protruding therefrom.

7. The plug of claim 1 wherein said outer end of said shank has a generally rectangular slot formed therein.

8. The plug of claim 1 wherein said outer end of said shank has an opening formed therein.

\* \* \* \* \*